United States Patent [19]

Wieczorek et al.

[11] 3,803,429

[45] Apr. 9, 1974

[54] SWITCHABLE FREQUENCY TONE FILTER AND DETECTOR WITH HIGH SPEED SWITCHING CAPABILITY

[75] Inventors: Alfred B. Wieczorek; Ronald E. Poorvin, both of Plantation, Fla.

[73] Assignee: Motorola, Inc., Franklin Park, Ill.

[22] Filed: Nov. 7, 1972

[21] Appl. No.: 304,440

[52] U.S. Cl. .................... 307/304, 325/55, 328/149

[51] Int. Cl. .......................................... H03k 23/30

[58] Field of Search ...... 325/55; 307/304, 221, 205, 307/251, 279, 303; 328/146, 149

[56] References Cited

UNITED STATES PATENTS

| | | | |
|---|---|---|---|
| 3,670,242 | 6/1972 | McGarvey | 325/55 |
| 3,517,312 | 6/1970 | Yamato | 325/55 |
| 3,716,790 | 2/1973 | Romoser | 325/55 |

*Primary Examiner*—Rudolph V. Rolinec
*Assistant Examiner*—Ro E. Hart
*Attorney, Agent, or Firm*—Eugene A. Parsons; Vincent J. Rauner

[57] ABSTRACT

An electronically variable tone signal filter and detector for receiving a plurality of tone signals in sequence. The filter circuit has a predetermined energy build up and decay rate and includes a first circuit element for determining the tone signal frequency coupled through the filter, and a second circuit element for determining the bandwidth of the filter. A first circuit is coupled to the first circuit element and is responsive to control signals coupled thereto to change the tone signal frequency the filter circuit couples therethrough. A second circuit is coupled to the second element and responsive to control signals coupled thereto to increase the bandwidth of the filter circuit. The increased bandwidth causes an increase in the energy decay rate of the filter.

26 Claims, 2 Drawing Figures

SWITCHABLE FREQUENCY TONE FILTER AND DETECTOR WITH HIGH SPEED SWITCHING CAPABILITY

BACKGROUND OF THE INVENTION

Filters may be designed to have a particular bandwidth and to pass one or more frequencies in a particular range. Such filters may be programmable, or variable, in that the filter may be varied by logic and switching circuits in response to receipt of a first predetermined tone signal frequency, thereby changing the filter frequency and allowing it to pass a second predetermined tone signal. The use of such programmable filters has increased with the advent of active filters, because of the fewer component changes necessary to change the frequency of an active filter. However, active filters, and particularly those in integrated circuit form, are adversely affected by the switching circircuits and techniques employed to vary the frequency and bandwidth determining components.

Filters such as noted above, have predetermined energy build up and decay rates in response to the desired tone signals. That is, the energy in the filter must first build up in response to the first tone, then it must decay after termination of the first tone before the next tone can be coupled through the filter. This prevents the receipt and detection of tones in rapid succession.

It is desirable to use such filters in selective signalling systems such as paging systems. These systems send out the selective signalling tone signals in rapid succession. The filter employed in the radio receiver detector for selecting and passing the desired tone signals must have a rapid build up and decay rate in order to select and pass the desired tone signal sequence.

SUMMARY OF THE INVENTION

It is, therefore, an object of this invention to provide a filter having a variable frequency and bandwidth.

Another object of this invention is to provide a filter for selecting and passing a plurality of tone signals in rapid succession.

Yet another object of this invention is to provide a filter having a rapid decay rate in order to select and pass the desired tone signal sequences in rapid succession.

A further object of this invention is to provide a programmable active filter capable of responding to a plurality of predetermined tones in rapid succession.

A still further object of this invention is to provide a programmable active filter circuit wherein the switching circuits necessary to vary the bandwidth and frequency of the filter do not adversely affect the filter operation.

A yet further object of this invention is to provide a switchable frequency tone detector capable of responding to a plurality of predetermined tone signals in rapid succession.

In practicing this invention, an electronically variable tone signal filter and detector are provided for receiving a plurality of tone signals in sequence. The filter employed has a predetermined energy build up and decay rate. The filter circuit includes a first circuit element for determining the tone signal frequency coupled through the filter, and a second circuit element for determining the bandwidth of the filter circuit. A first circuit is provided which includes a plurality of switching circuits, each of which includes an impedance and a switch. The first circuit is coupled to the first circuit element and is responsive to control signals to selectively connect one or more above-noted impedances to the first circuit element. The connection changes the frequency of the filter circuit to another of the plurality of tone signal frequencies. A second circuit is provided which also includes an impedance and a switch. The second circuit is coupled to the second circuit element and is responsive to control signals to connect the impedance to the second circuit element for a predetermined period of time. The filter circuit is operative in response to the connection to change the bandwidth of the filter for increasing the energy decay rate. This allows a succeeding tone signal to be coupled through the filter in a shorter time period.

THE DRAWINGS

DESCRIPTION OF THE PREFERRED EMBODIMENT

Figure 1:
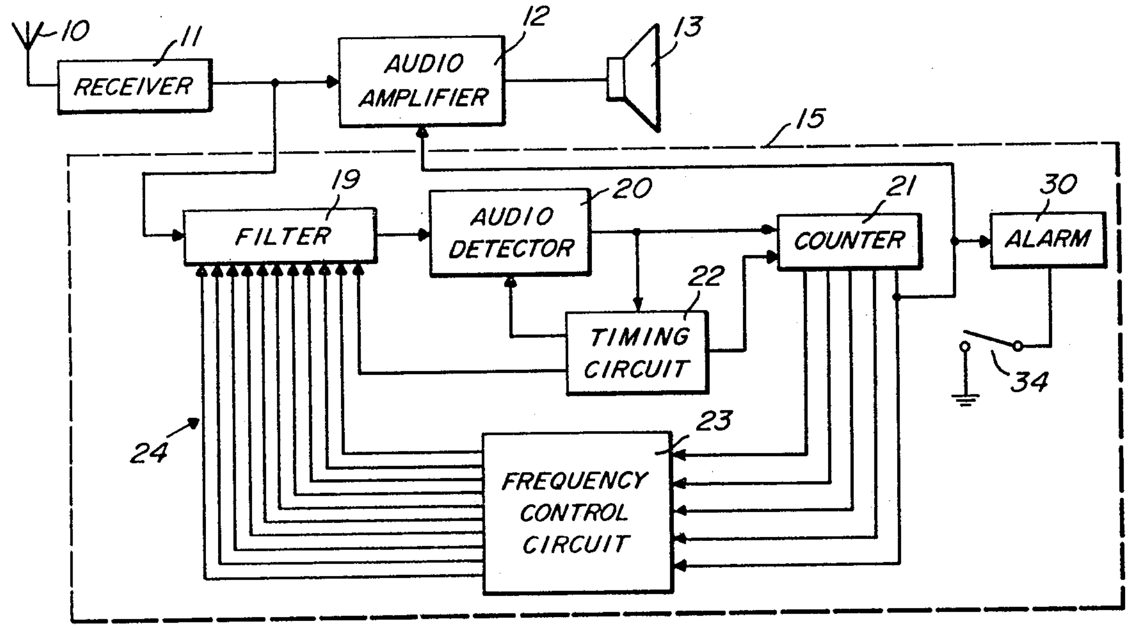
FIG. 1 is a block diagram of a selective signalling receiver employing the switchable frequency tone detector and switchable frequency tone filter of this invention.

Referring to FIG. 1, radio frequency signals, modulated by audio frequency signals and predetermined tone signals are received at antenna 10 and coupled to receiver 11. Receiver 11 may be a standard double conversion FM receiver such as is well known in the art. The radio frequency signals are demodulated in receiver 11 and the predetermined tone signals and audio signals are coupled to audio amplifier 12. The amplified audio signals are reproduced by loudspeaker 13 which is coupled to audio amplifier 12.

A switchable frequency tone detector 15 is coupled to the discriminator of receiver 11 for receiving a particular number of predetermined tone signals in sequence. Tone detector 15 may include circuitry connected to audio amplifier 12, for maintaining audio amplifier 12 in an inoperative condition until the correct tone signal sequence has been detected by detector 15. Tone detector 15 then provides a selective squelch feature which allows the audio to be reproduced only upon receipt of the particular predetermined tone sequence for that receiver.

In the embodiment shown, five sequentially received, predetermined tone signals are necessary to cause the operation of tone detector 15. Each tone signal has a time period of 33 milliseconds. The first tone signal of the predetermined tone signal sequence is coupled from the discriminator of receiver 11 to tone filter 19. Tone filter 19 is adjusted to have a center frequency corresponding to the first tone signal frequency via circuitry more fully described below. The tone filter 19 also has a predetermined energy build up and decay rate in response to the tone signal frequency to which it is adjusted. The first predetermined tone signal will cause an energy build up in filter 19 and will then be coupled through filter 19 to audio detector 20. If the tone signal is coupled to audio detector 20 for a predetermined time period, it will develop a detection signal. The detection signal is coupled to counter 21, causing the counter to change from a "zero" count to a "one" count. The detection signal is also coupled to timing circuit 22. Timing circuit 22 may be a number of monostable multivibrators such as are commonly known in the art, which change states in response to an appropriate input signal, and stay in the new state for a predetermined time period, then return to their original state. Timing circuit 22 may also be a ripple counter, such as is commonly known in the art, which resets upon receipt of an input signal and begins a new timing cycle. In the preferred embodiment, timing circuit 22 is a ripple counter.

Timing circuit 22 will reset in response to the detection signal and begin a new count. For a predetermined period of time after timing circuit 22 begins a new count it will develop a first timing signal. In the embodiment shown, the time period is 4 milliseconds. The first timing signal developed is coupled from timing circuit 22 to filter 19. Filter 19 in response to the reset signal increases its bandwidth for the predetermined period of time that timing circuit 22 develops its first timing signal. Increasing the bandwidth of filter 19 causes an increase in the decay rate for the tone signal energy stored in the filter. The amount of increase in decay rate is proportional to the amount of increase in bandwidth of filter 19. An increased decay rate means that tone signal energy stored in filter 19 is discharged more rapidly. By more rapidly discharging the tone signal energy in filter 19, the filter can respond to a succeeding tone in the tone signal sequence in a shorter period of time. In the embodiment shown, each tone signal has a time period of 33 milliseconds.

The first timing signal is also coupled from timing circuit 22 to audio detector 20. Audio detector 20 will discharge the tone signal energy developed in response to the last tone. Again, as above, by more rapidly discharging the tone signal energy in audio detector 20, the detector can respond to a succeeding tone in the tone signal sequence in a shorter period of time.

As mentioned above, counter 21 develops a first counting signal in response to the detection of the first tone signal. This "one" count signal is coupled to frequency control circuit 23. Frequency control circuit may be a simple diode logic circuit such as is commonly known in the art which can develop combinations of output or control signals in response to input signals from a counter. Frequency control circuit 23 develops a plurality of control signals in response to the "one" count signal which are coupled to filter 19 over conductors 24. 11 conductors are shown in this embodiment, although only five sequential tones are required to actuate tone detector 15. 11 conductors are shown because there are twelve tones which may be employed in the five tone sequence. Only eleven conductors are necessary as the twelfth tone is produced by a fixed component. Frequency control circuit 23 is programmed in accordance with the desired tone signal sequence so as to provide particular combinations of control signals on conductors 24 in response to each count. It is to be understood, however, that this invention is not limited to a five tone detector or to a frequency control circuit having 11 outputs. The control signals coupled to filter 19 from frequency control circuit 23 cause filter 19 to change its center frequency to the frequency of the second tone in its predetermined tone sequence.

Tone signals 2, 3, 4 and 5 in the predetermined tone signal sequence are then sequentially received and coupled to tone detector 15 producing the same sequence of operation as described above with respect to the first tone. Counter 21 upon receipt of the second tone detection will register a 2 count; upon receipt of the third tone detection will register a 3 count, etc. Each detection by audio detector 20 will cause timing circuit 22 to reset and develop a first timing signal which is coupled to filter 19 and detector 20. The first timing signal, from timing circuit 22 will cause an increase in the bandwidth of filter 19 for the predetermined time period, thus substantially increasing the energy decay rate and will also discharge detector 20. Each count from counter 21 will also be coupled to frequency control circuit 23. Frequency control circuit 23 will develop control signals in response to each count which are coupled to filter 19, causing the filter to change its center frequency to the next predetermined frequency in the tone signal sequence.

When the fifth tone in the tone signal sequence is detected, counter 21 will develop a 5 count signal. The signal is coupled to alarm 30 for producing an audio alerting signal, and to audio amplifier 12, allowing amplifier 12 to amplify the audio signals and couple them to speaker 13 reproduction.

When the message is completed, the user may actuate reset switch 34. Reset switch 34 provides a ground which resets counter 21 to a "zero" count, and terminates the audio alerting signal from alarm 30. If the user does not manually reset the unit, timing circuit 22 will develop a second timing signal 45 milliseconds after it has been reset. This second timing signal is coupled to counter 21, causing counter 21 to reset to a "zero" count. Frequency control circuit 23, in response to the "zero" count will develop control signals which are coupled to filter 19 over conductors 24. The control signals coupled to filter 19 cause it to change its center frequency to the frequency of the first tone in its predetermined tone sequence, thus resetting the unit for another call.

If an improper tone signal sequence is coupled to tone detector 15, the incorrect tone in the sequence will not be coupled through filter 19 to audio detector 20, and counter 21 will not develop the appropriate counting signal. Timing circuit 22 will be reset and start a timing cycle in response to each detection. If an improper tone sequence is received, for example, the third tone being incorrect, it will not be coupled through filter 19, and detected by detector 20. Timing circuit 22 will develop the second timing signal after 45 milliseconds. This second timing signal will be coupled to counter 21, causing it to reset to a "zero" count. Detector 15 is then reset to begin receipt of a new tone sequence.

Figure 2:
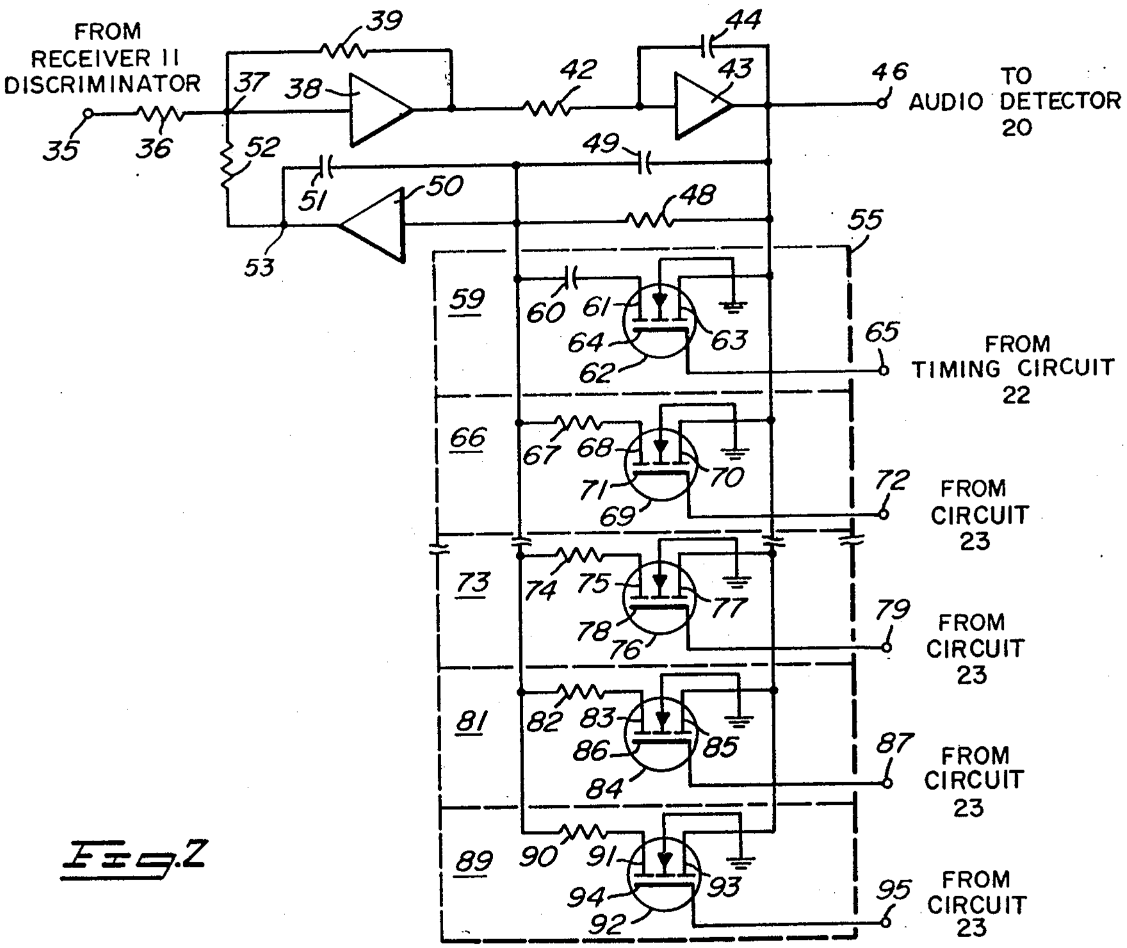
FIG. 2 is a combined schematic and block diagram of the switchable frequency tone filter of this invention.

Referring to FIG. 2, there is shown a more detailed schematic and block diagram of the filter 19 in FIG. 1. The schematic and block diagram shown in FIG. 2 is an electronically variable active filter employing three operational amplifier stages. The predetermined tone signals developed at the discriminator of receiver 11 are coupled to input terminal 35 of filter 19. Resistor 36 connects input terminal 35 of filter 19 to input terminal 37 of operational amplifier 38. Resistor 39 is coupled in parallel with operational amplifier 38. Resistor 42 connects the output of operational amplifier 38 to the input of operational amplifier 43. Capacitor 44 is coupled in parallel with operational amplifier 43. The output of operational amplifier 43 is coupled to output terminal 46, and to the parallel combination of resistor 48 and capacitor 49. The parallel combination of resistor 48 and capacitor 49 couples the output of operational amplifier 43 to the input of operational amplifier 50. Capacitor 51 and resistor 47 are coupled in parallel with operational amplifier 50, and the output of operational amplifier 50 is coupled through resistor 52 to input terminal 37 of operational amplifier 38. Amplifiers 38, 43 and 50 each have extremely high gain; however, with the components in parallel across each amplifier as shown, a feedback path is provided which reduces the gain to less than 1.

Amplifier 38 with resistor 39 thereacross, operates as an adder circuit. Amplifier 43 with capacitor 44 thereacross, and amplifier 50 with capacitor 51 thereacross both operate as integrator circuits. The design of an operational amplifier active filter as shown in FIG. 2 is commonly known by those skilled in the art, and with the configuration as shown operates as a bandpass filter.

The center frequency of this operational amplifier active bandpass filter is defined by the formula:

$$W_O = K/R_{48} \tag{1}$$

Where $$K = R_{39} / R_{52} \times 1/R_{42} C_{44} \times 1/C_{51}$$

The radian bandwidth for this filter is defined by the formula:

$$B = KC_{49} \tag{2}$$

The gain of this filter at the resonant frequency is defined by the formula:

$$A = R_{52}/R_{36} \times C_{51}/ C_{49} \tag{3}$$

These show that by varying $R_{48}$, the resonant frequency of this active bandpass filter can be changed with no influence on bandwidth and gain. Accordingly, by programming values of $R_{48}$, the filter will have the property of having a programmable center frequency with a constant bandwidth and gain. This property is particularly important in tone coded selective signalling systems where the tones are equally spaced to assure equal selectivity for each tone.

In response to an energy pulse at the frequency to which the filter is tuned, the envelope of the filter output at terminal 46 will exponentially increase with a time constant given by the formula:

$$T = 2/B \tag{4}$$

Similarly, when the signal to which the filter is tuned is removed, the output signal at terminal 46 will decrease or decay with the same time constant.

As noted above, in sequential tone selective signalling applications, it is desirable that the signal energy developed by the filter, in response to a predetermined tone, decay as rapidly as possible once the tone is detected. This rapid decay is necessary in order to more quickly begin an energy build up in response to the next tone in the sequence, which in turn allows an increase in the rate at which the tone signals may be received and detected. As can be seen by reference to the above noted formula 4, the energy decay rate in filter 19 will be increased in proportion to any increase in the bandwidth. An increase in bandwidth along, however, may be undesirable as it allows additional energy to be coupled through filter 19. This additional energy can cause falsing.

Although the fequency will remain the same when the bandwidth is increased, as shown by formula 1, formulas 2 and 3 show that there will be a proportionate decrease in filter gain with bandwidth increase. That is, the gain bandwidth product is a constant. When the gain is reduced, less signal is coupled through filter 19. Extraneous signals will not, therefore, be coupled through the filter 19, even though the bandwidth is increased. This decrease in gain when bandwidth is increased allows use of the technique of bandwidth increase to speed up energy decay rate in filter 19, without causing spurious or false operation of filter 19 and tone detector 15.

If it is desired to further speed up the energy decay rate of the filter, resistor 48, the frequency determining resistor, can be varied in value so as to change the filter frequency to the center frequency of the next tone signal in the sequence. This change in frequency of the filter also acts to produce an increase in the energy decay rate of filter 19. The two switching actions can be used in combination. That is, the increase in the bandwidth and the change in frequency can be used together to further increase the energy decay rate in the filter, thus allowing a substantially increased rate of receipt of sequential tones.

Switching network 55 includes the circuitry necessary to switch the frequency and bandwidth of filter 19. Network 55 includes a plurality of switching circuits 59, 66, 73, 81 and 89 with each being connected in parallel with resistor 48 and capacitor 49. Only five switching circuits are shown in FIG. 2, however, in the preferred embodiment, eleven are used.

Switching circuit 59 in network 55 includes capacitor 60 having one terminal connected to one terminal of capacitor 49 and a second terminal connected to drain electrode 61 of field effect transistor (FET) 62. The source electrode 63 of FET 62 is connected to the other terminal of capacitor 49. Gate electrode 64 of FET 62 is connected to terminal 65. Terminal 65 is connected to timing circuit 22 shown in FIG. 1. Switching circuit 59 is effectively coupled in parallel with bandwidth determining capacitor 49. The series combination of capacitor 60 and FET 62 comprise a network for changing the bandwidth of filter 19. Switching circuit 66 includes resistor 67 having a first terminal connected to one terminal of resistor 48 and a second terminal connected to drain electrode 68 of FET 69. The source electrode 70 of FET 69 is coupled to the other terminal of resistor 48, and gate electrode 71 is coupled to terminal 72. Terminal 72 is coupled via one of the conductors 24 to frequency control circuit 23 shown in FIG. 1. Switching circuit 66 is effectively coupled in parallel with frequency determining resistor 48 and switching circuit 59. The series combination of resistor 67 and field effect transistor 69 comprise one circuit for changing the frequency of filter 19.

Switching circuit 73 includes resistor 74 having a first terminal coupled to one terminal of resistor 48 and a second terminal coupled to drain electrode 75 of FET 76. The source electrode 77 of FET 6 is coupled to the other terminal of resistor 48, and the gate electrode 78 is coupled to terminal 79. Terminal 79 is connected via one of conductors 24 to frequency control circuit 23 shown in FIG. 1. Switching circuit 73 is also effectively in parallel with frequency determining resistor 48 and switching circuit 66 and constitutes a second network for changing the frequency of filter 19.

Switching circuit 81 includes resistor 82 coupled to one terminal of resistor 48 and to drain electrode 83 of FET 84. Source electrode 85 of FET 84 is coupled to the other terminal of resistor 48, and gate electrode 86 is coupled to terminal 87. Terminal 87 is coupled via one of conductors 24 to frequency control circuit 23 shown in FIG. 1. Switching circuit 81 has the same function as circuits 66 and 73 and is effectively in parallel with each and resistor 48.

Switching circuit 89 includes resistor 90 having one terminal coupled to resistor 48 and a second terminal coupled to drain electrode 91 of FET 92. Source electrode 93 of FET 92 is coupled to the other terminal of resistor 48, and the gate electrode 94 is coupled to terminal 95. Terminal 95 is connected via one of conductors 24 to frequency control circuit 23 shown in FIG. 1. Switching circuit 89 has the same function as circuits 66, 73 and 81 and is effectively in parallel with each, and in parallel with frequency determining resistor 48 and bandwidth capacitor 49 in filter 19. A bias resistor 96 is coupled from the junction of each source electrode of FETS 62, 69, 76, 84 and 92 to ground potential. Resistor 96 acts to provide the necessary biasing for operation of each of the above noted FETS.

In operation, a control signal from timing circuit 22 is coupled to gate electrode 64 of FET 62 in switching circuit 59 causing FET 62 to conduct. With FET 62 conductive, capacitor 60 is effectively coupled in parallel with bandwidth determining capacitor 49 in filter 19. The combined capacitive reactance of capacitors 60 and 49 cause an increase in bandwidth of filter 19. The control signal from timing circuit 22 is coupled to FET 62 for a predetermined time period. When the control signal is removed, FET 62 again becomes nonconductive. With FET 62 non-conductive, capacitor 60 is no longer coupled in parallel with capacitor 49 so that the bandwidth of filter 19 returns to the bandwidth determined by the value of capacitor 49.

A control signal from frequency control circuit 23 will be coupled to gate electrode 71 of FET 69 in switching circuit 66 via one of conductors 24, causing FET 69 to conduct. With FET 69 conductive, resistor 67 will be coupled in parallel with frequency determining resistor 48 in filter 19. The combined parallel impedance of resistors 48 and 67 will cause a change in the center frequency of filter 19. Removal of the control signal from conductors 24 will render FET 69 non-conductive. With FET 69 non-conductive, resistor 67 is no longer in parallel with resistor 48 and the filter 19 will return to the center frequency determined by the value of frequency determining resistor 48.

Switching circuits 73, 81 and 89 each operate in a manner identical to switching circuit 66 when the appropriate control signal is coupled thereto from frequency control circuit 23. Any one of the switching circuits 66, 73, 81 and 85 can be individually actuated for varying the center frequency of filter 19 or a number of them can be actuated simultaneously. The resistances of those in parallel which have been actuated will then determine the center frequency to which filter 19 will be tuned.

In the embodiment shown, it is advantageous to simultaneously actuate combinations of circuits in order to cause filter 19 to tune to each tone signal frequency in the desired code. By using combinations of networks, a decreased switch size may be used for each FET, allowing the entire circuit shown to be manufactured more readily in integrated circuit form.

FETS provide the necessary switching in switching circuits 59, 66, 73, 81 and 89 because they minimize the control power required and provide high isolation between frequency control circuit 23 and filter 19. In addition, FETS may be easily fabricated in integrated circuit form. In the preferred embodiment, the source electrode of each FET is connected together and to a common reference point at the junction of resistor 96 and resistor 48. The use of a common reference point for each FET eliminates the possibility of interaction between each of the switching circuits, so that no isolation is required between each FET switch. By eliminating the need for isolation between the switches, integration on a single integrated circuit is facilitated.

A problem, however, associated with connecting each source electrode to a common reference point on an integrated circuit chip is that the common reference point, being necessarily large in area, gives rise to a capacitance between the source electrode and the substrate material of the integrated circuit chip. This capacitance could be detrimental to the operation of filter 19 if the source electrode were connected to the input of amplifier 50, because it would improperly load the input of amplifier 50. To eliminate this problem, the combined source electrodes are coupled to the output of amplifier 43. The impedance at the output of amplifier 43 is such that it will not be affected by this source electrode to integrated circuit substrate capacitance.

When one or more of the FETS are actuated, a drain electrode to substrate capacitance is, however, developed at the input of amplifier 50. This drain electrode to substrate capacitance will combine with the source electrode to substrate capacitance and form a shunt capacitance across bandwidth determining capacitor 49. This shunt capacitance can detrimentally increase the bandwidth of filter 19. In order to eliminate this effect in an integrated circuit chip, the integrated circuit chip substrate material is directly connected to either an AC or DC ground potential. The source electrode to substrate capacitance, and drain electrode to substrate capacitance will then act as small capacitive loads to ground on the outputs and inputs of amplifiers 43 and 50, respectively. Because of the values of capacitances involved, and the input and output impedances of the active filter amplifiers, a minimal loading on the amplifiers will be provided.

As can be seen, a filter has been provided which has a variable frequency and bandwidth, and can select and pass a plurality of tones in succession. The filter can pass a plurality of tones in rapid succession because of the rapid filter energy decay rate provided by selectively increasing the filter bandwidth. The filter includes switching circuitry which provides high isolation between the filter and the logic circuitry for providing the control signals and is designed to be easily implemented in integrated circuit form. The filter, switching circuitry and logic circuitry act together to provide a switchable frequency tone detector capable of responding to a plurality of predetermined tones in rapid succession.

We claim:

1. A switchable fequency tone detector for receiving and passing a plurality of tone signals in sequence including in combination; filter means having a predetermined energy build up and decay rate in response to said tone signals, and including a first circuit element for determining the tone signal frequency said filter means couples therethrough, and a second circuit element for determining the bandwidth of said filter means, circuit means coupled to said filter means and operative in response to each of said tone signals in said sequence being coupled thereto to change the tone signal frequency said filter means couples therethrough to the following tone signal frequency in said sequence, and to increase the bandwidth of said filter means for increasing the energy decary rate therein, whereby a succeeding tone signal may be coupled therethrough in a shorter time period.

2. The tone detector of claim 1 wherein said circuit means includes, detector means coupled to said filter means and operative to develop a detection signal in response to said filter means coupling each of said tone signals in said sequence therethrough, and logic means coupled to said detection means and operative in response to each detection signal to develop control signals for changing the tone signal frequency said filter means couples therethrough to the following tone signal frequency in said sequence.

3. The tone detector of claim 2 wherein said circuit means further includes, first circuit means coupled to said first circuit element and to said logic means and responsive to said control signals for changing said tone signal frequency said filter means couples therethrough to another of said plurality of tone signal frequencies, and second circuit means coupled to said second circuit element and said detector means and responsive to said detection signals to increase the bandwidth of said filter means for increasing the energy decay rate therein.

4. The tone detector of claim 3 wherein said filter means is a multi-stage active filter circuit.

5. The tone detector of claim 4 wherein said first circuit element includes first resistance means, and said first circuit means includes at least one switching circuit means, said switching circuit means including second resistance means and second switching means coupled together and to said first circuit element and said logic means, said second switching means operative in response to said control signals coupled thereto to selectively couple said second resistance means to said first resistance means for changing said tone signal frequency coupled through said filter means to another of said plurality of tone signal frequencies.

6. The tone detector of claim 5 wherein said second circuit element is a first reactance means and said second circuit means includes second reactance means and third switching means coupled together and to said second circuit element and said detector means, said third switching means operative in response to said detection signal coupled thereto to couple said second reactance means to said second circuit element for increasing the bandwidth of said filter means.

7. The tone detector of claim 6 wherein said second switching means is a field effect transistor having gate, source and drain electrodes, said drain and source electrodes being coupled in series with said second resistance means, said gate electrode being coupled to said logic means, said second resistance means and said field effect transistor being coupled in parallel with said first circuit element.

8. The tone detector of claim 7 wherein said third switching means is a field effect transistor having gate, drain and source electrodes, said drain and source electrodes of said field effect transistor being coupled in series with said second reactance means, said gate electrode being coupled to said detector means, said second reactance means and field effect transistor being coupled in parallel with said second circuit element.

9. The tone detector of claim 8 wherein said first and second reactance means are capacitive reactances.

10. The tone detector of claim 9 wherein said filter means has a gain which varies in accordance with said bandwith, said gain bandwidth product being a constant.

11. The tone detector of claim 10 wherein said second circuit element is operative in response to said detection signal coupled thereto to increase said bandwidth for a predetermined period of time.

12. The tone detector of claim 11 wherein said logic means includes counter means for counting said detection signals, said counter means developing said control signals in response to each count.

13. The tone detector of claim 12 wherein said circuit means includes timing means coupled to said detector means and said second circuit means, said timing means being responsive to said detection signal to operate said second circuit element for said predetermined period and to terminate said detection signal, said timing means being further coupled to said counter means and responsive to the absence of a detection signal to reset said counter means.

14. An electronically variable filter for receiving a plurality of tone signals in sequence including in combination; filter circuit means having a predetermined energy build up and decay rate and including a first circuit element for determining the tone signal frequency said filter circuit means couples therethrough, and a second element for determining the bandwidth of said filter circuit, first circuit means coupled to said first element and responsive to first control signals coupled thereto to change the tone signal frequency said filter means couples therethrough to another of said tone signal frequencies, and second circuit means coupled to said second element and responsive to control signals coupled thereto to increase the bandwidth of said filter means for increasing the energy decay rate therein whereby a succeeding tone signal may be coupled therethrough in a shorter time period.

15. The filter of claim 14 wherein said first circuit element is a first impedance means, and said first circuit means includes a plurality of switching circuit means each of said switching circuit means including second impedance means and first switching means coupled together and to said first element, said first switching means operative in response to said control signals coupled thereto to connect said second impedance means to said first impedance means for changing said tone signal frequency coupled through said filter means to another of said plurality of tone signal frequencies.

16. The filter of claim 15 wherein said second circuit element is a third impedance means and said second circuit means includes a fourth impedance means and first switching means coupled together and to said third impedance means, said first switching means operative in response to said control signals coupled thereto to connect said fourth impedance means to said third impedance means for changing the bandwidth of said filter means.

17. The filter of claim 16 wherein said first and second impedance means are resistance means and said third and fourth impedance means are reactance means.

18. The filter of claim 17 wherein said first switching means is a field effect transistor having gate, source and drain electrodes.

19. The filter of claim 18 wherein said switching circuit means includes said second impedance means coupled in series with said field effect transistor drain and source electrodes, said series combination being coupled in parallel with said first impedance means, said field effect transistor being operative in response to said control signals being coupled to said gate electrode to allow conduction therethrough from said drain to source electrode and connect said second impedance means in parallel with said first impedance means.

20. The filter of claim 19 wherein said second circuit means includes said fourth impedance means coupled in series with said field effect transistor drain and source electrodes, said series combination being coupled in parallel with said third impedance means, said field effect transistor being operative in response to said control signals being coupled to said gate electrode to allow conduction therethrough from said drain to source electrode and connect said fourth impedance means in parallel with said first impedance means.

21. The filter of claim 20 wherein said first and second circuit elements are coupled in parallel and said first and second circuit means are coupled in parallel.

22. The filter of claim 21 wherein said filter circuit means is a multi-stage active filter circuit including first, second and third operational amplifiers each having an input and output, said first amplifier output being coupled to said second amplifier input, said first and second circuit elements coupling said second amplifier output to said third amplifier input, said third amplifier output being coupled to said first amplifier input, said tone signals being coupled to said first amplifier input and coupled from said second amplifier output.

23. The filter of claim 22 wherein said third and fourth impedance means are capacitive reactances.

24. The filter of claim 23 wherein said switching circuit means includes said resistance means having a first and second terminal, said first terminal being coupled to said third amplifier input and said second terminal being coupled to said field effect transistor drain electrode, said field effect transistor source electrode being coupled to said second amplifier output.

25. The filter of claim 24 wherein said second circuit means includes said capacitive reactance having a first and second terminal, said first terminal being coupled to said third amplifier input and said second terminal being coupled to said field effect transistor drain electrode, said field effect transistor source electrode being coupled to said second amplifier output.

26. The filter of claim 25 wherein said filter is manufactured in integrated circuit form, said field effect transistor source electrodes being coupled together thereon, said integrated circuit having a substrate layer said substrate layer being grounded.

* * * * *